Patented Apr. 29, 1941

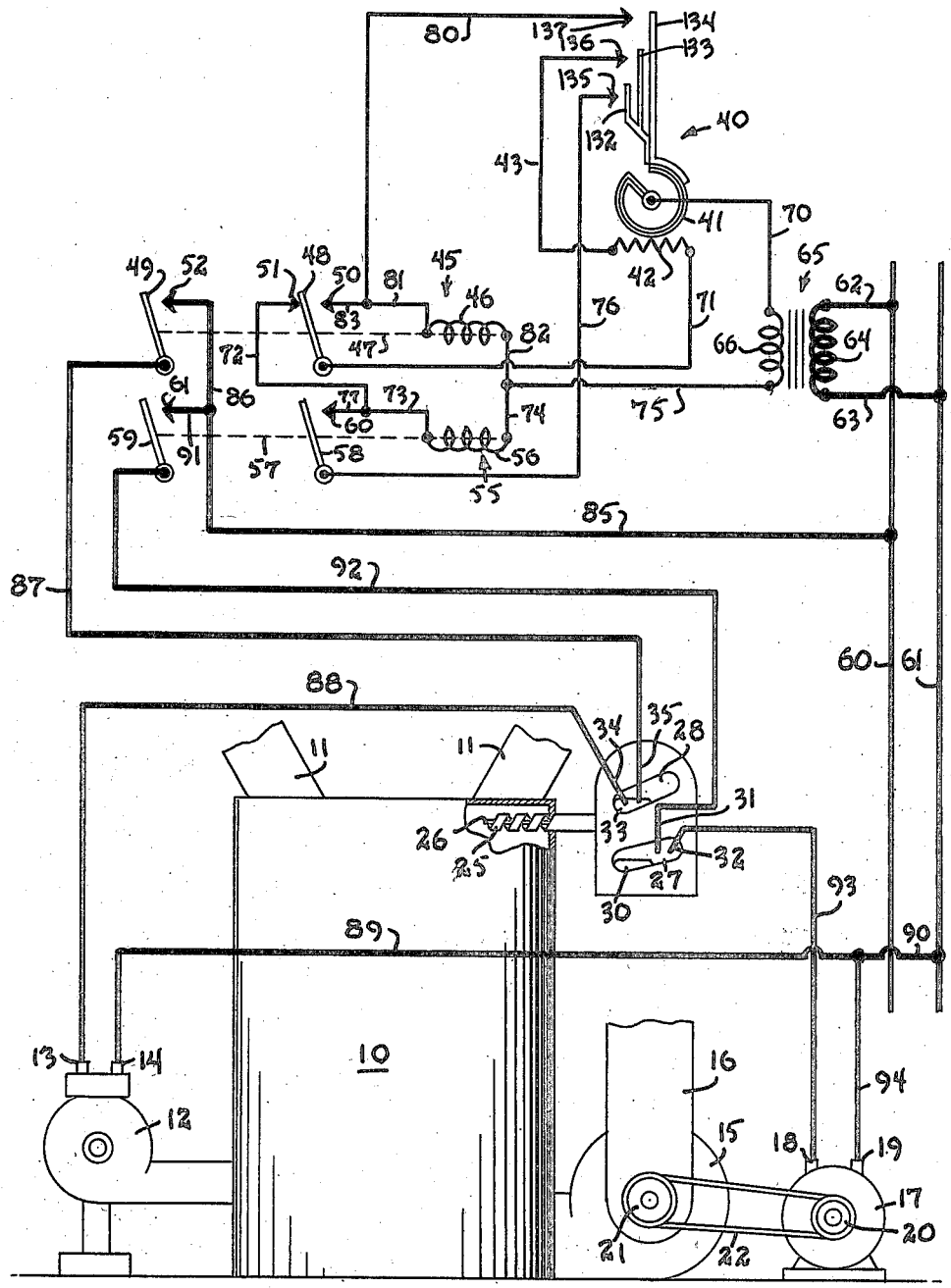

2,240,003

UNITED STATES PATENT OFFICE 2,240,003

TEMPERATURE CONTROL SYSTEM

William L. McGrath, St. Paul, Minn., assignor to Minneapolis-Honeywell Regulator Company, Minneapolis, Minn., a corporation of Delaware Application December 8, 1937, Serial No. 178,722

7 Claims. (Cl. 236—11)

This invention relates to a heating system and more particularly to a system of controls for a warm air furnace wherein a circulator is provided for circulating warm air through the heating chamber of the furnace and the space to be heated.

It has heretofore been proposed to control the operation of the circulator and the heating means, which may be in the form of an oil burner for example, by means of a thermostat located in the space to be heated, with additional controls to start operation of the circulator only when the temperature of the heating chamber is above a predetermined value, and to stop operation of the burner when the temperature of the heating chamber is above a higher predetermined value. In this type of a system, the burner starts operating every time there is a call for heat by the thermostat, and this may be unnecessary in many cases since there may be sufficient heat in the furnace to raise the temperature of the space to the desired value without operating the burner. As a result of operating the burner, the temperature of the space may rise above the desired value after the circulator operation has been stopped by the thermostat, by reason of the addition of unnecessary heat in the heating chamber, a certain portion of which is bound to reach the space being heated. The result of this is that the temperature of the space may fluctuate considerably, causing discomfort to the occupants of the space.

In an attempt to overcome this defect of the above type of system, other systems have been proposed in which the first call for heat by the thermostat causes operation of the circulator only, and in case the residual heat in the furnace is insufficient to cause an increase in the temperature of the space, and the temperature in the space falls still further, the burner starts operating and continues to operate until the temperature of the space rises to a predetermined value. In order to prevent too short and frequent burner operation, the burner operation is stopped at a space temperature somewhat higher than that at which it is started. Were the burner started and stopped at practically the same temperature, it might result in extremely short and frequent periods of running, which is undesirable, as is well known.

With this type of system, the space temperature is maintained more nearly constant than with the first described system. However, due to the fact that the burner keeps operating, once it starts operating, until the space temperature reaches the higher value, it is obvious that the space temperature will sometimes rise to an excessive value subsequent to periods of burner operation, and the present invention is concerned with improving this last described system.

In the present invention, the circulator is caused to run as long as the space temperature is below a predetermined value. The burner is caused to operate whenever the temperature reaches a low predetermined value, and continues to run until the temperature rises above this value. Since as discussed above, it would be undesirable for the burner to stop as soon as the temperature rises above the value at which it starts operating, the burner continues to run, but does not run until a predetermined temperature in the space is reached. Instead, it runs for a certain period of time, this time being variable and dependent upon outdoor temperature and the rate of rise in temperature in the space. In other words, the greater the rate of rise in temperature in the space, the sooner the burner stops, without the temperature having to rise to any particular value however. This time is so chosen that the burner will not have a too short running period, and yet the danger of overheating of the space is eliminated. The circulator continues to operate and will stop if the temperature of the space reaches a predetermined value. If the temperature of the space drops after the burner has stopped, it will again be started after a certain length of time, and its cycle repeated. The system is so designed that under ordinary conditions, the circulator will be operated nearly continuously, and the burner will be operated just often enough to maintain the temperature of the heating chamber and the space being heated at fairly constant values.

The continuous operation of the circulator and the maintenance of a substantially uniform temperature of the heating chamber results in air being continuously circulated through the space at a temperature just high enough to maintain a uniform temperature in the space which results in greater comfort to the occupants. Also, by reason of the continuous circulation of heated air through the space, the air therein is kept in motion, thus reducing the possibility of stratification of the air, or the air being cooled by windows, etc., sinking to the lower regions of the space with the result that, while the air at the level of the thermostat may be at a desired value, the air adjacent the floor is considerably lower, which causes discomfort to the occupants.

This invention has for its object to provide an improved heating system of a type wherein a heating medium is supplied to a space practically continuously at a temperature sufficiently high to maintain the temperature of the space being heated, constant.

A further object is to provide an improved control device for such a system.

A further object is to provide an improved two stage control circuit.

Other objects will become apparent upon an examination of the specification and claims in connection with the accompanying drawing wherein is illustrated schematically a preferred form of my invention.

Referring to the drawing, a warm air furnace is represented by the reference character 10. This furnace is provided with the usual warm air ducts 11, and a conventional type of oil burner 12 is provided for supplying heat to the heating chamber of said furnace. The oil burner 12 is provided with terminals 13 and 14 which are to be connected to a source of power. A blower 15 is provided for circulating air through the heating chamber of said furnace and through a space or spaces to be heated. Communicating with the intake of said blower is a return air duct 16, the exhaust side of said blower being connected to the heating chamber of said furnace.

A motor 17 is provided for driving the blower 15, said motor being provided with terminals 18 and 19 to be connected to a suitable source of power. Motor 17 is provided with a pulley 20 which is connected to a pulley 21 of the blower by means of a belt 22.

Mounted in the heating chamber of said furnace is a bimetallic element 25 which is fixed at one end and connected to a rod 26 at its other end, said rod being operatively connected to switches 27 and 28 to actuate the same in a well-known manner in response to changes in temperature in the heating chamber. Switch 27 includes a mercury element 30 and contacts 31 and 32. Switch 28 includes a mercury element 33 and contacts 34 and 35. Switch 27 is tilted to a position in which the mercury element 30 bridges the contacts 31 and 32 when the temperature of the heating chamber reaches a predetermined value, and switch 28 is tilted to a position in which the mercury element moves to the opposite end of the tube from that illustrated, thus interrupting the circuit through contacts 34 and 35 when a higher predetermined temperature is attained in the heating chamber.

Mounted in the space to be heated is a thermostat represented generally by the reference character 40. Said thermostat includes a bimetallic element 41, and three contact arms 132, 133, and 134 connected to said bimetallic element for movement in response to changes of temperature in the space. Cooperating with said arms are fixed contacts 135, 136, and 137, respectively. These contacts are positioned with respect to said arms so that contact 135 is engaged by contact 132 when the temperature in the space drops to one value, contact 136 is engaged by blade 133 when the temperature drops to a second low value and contact 137 is engaged by blade 134 when the temperature drops to a still lower value. Blades 132 and 133 are made flexible so that after they have engaged their respective contacts they will flex, permitting movement of blade 134 into engagement with contact 137. Mounted in close relationship with the bimetallic element 41 is an electrical heating element 42 connected by means of a conductor 43 to the contact 136 for a purpose to be later described.

For controlling the operation of the oil burner 12 is a relay generally indicated by the reference character 45. This relay comprises a coil 46, an armature 47, blades 48 and 49 connected to the armature 47 and fixed contacts 50, 51, and 52. When the relay coil 46 is deenergized, the blade 48 is in engagement with the contact 51 and upon energization of the coil 46, blades 48 and 49 are moved by the armature 47 into engagement with the contacts 50 and 52, respectively.

A second relay 55 is provided for controlling the operation of the blower motor 17. This relay comprises a coil 56, an armature 57 and switch blades 58 and 59 operated by said armature. Contacts 60 and 61 are arranged to be engaged by the blades 58 and 59, respectively, when the coil 56 is energized and said blades are moved away from their respective contacts upon deenergization of the coil 56.

Lines 60 and 61 are connected to a suitable source of power (not shown), and are provided for conveying power to the oil burner 12 and the blower motor 17. Connected to the lines 60 and 61 by means of conductors 62 and 63 is a high tension winding 64 of a step-down transformer 65. The low tension secondary 66 of said transformer is provided for energizing the relays 45 and 55 and the heated element 42.

*Operation*

With the parts in the position illustrated, the temperature of the space to be heated is above a predetermined value and the thermostat 40 is not calling for heat. The temperature of the heating chamber is at a lower value so that the switch 27 is tilted to its open position. While in the normal operation of the system the motor 17 is intended to operate almost continuously so that the thermostat 40 is calling for some heat in the space and the switch 27 is tilted to closed position, the following description of the operation begins with the parts in the position shown rather than in their normal operating positions.

Upon an initial call for heat in the space by the thermostat 40 the bimetallic element 41 will cause blade 132 to engage contact 135. This alone does not cause operation of either the blower motor 17 or the oil burner 12. Upon a further drop in temperature the blade 133 will engage its contact 136 thus causing a circuit through the relay coil 56 as follows: from one side of the low tension winding 66 of the transformer 65 through conductor 70, bimetallic element 41, arm 133, contact 136, conductor 43, heater 42, conductor 71, switch blade 48, contact 51, conductors 72 and 73, coil 56 of relay 55 and conductors 74 and 75 to the other side of the low tension secondary 66. Energization of coil 56 causes blades 58 and 59 to move into engagement with contacts 60 and 61, respectively. Switch blade 58 upon engagement with contact 60 closes a holding circuit for relay coil 56 as follows: from the low tension secondary 66 through conductor 70, bimetallic element 41, blade 132, contact 135, conductor 76, blade 58, contact 60, conductors 77 and 73, coil 56 and conductors 74 and 75 to the other side of the secondary 66. It will therefore be apparent that the holding circuit through the coil 56 is independent of the blade 133 of thermostat 40 and coil 56 will be energized as long as blade 132 remains in engagement with contact 35. It should also be noted that the circuit through the heater 42 is in parallel with the holding circuit for the coil 56 and since there is relatively little resistance in this latter circuit compared to the heater circuit 42, there will be relatively little flow of current through heater 42 and there will be practically no heat generated in the heater at this time.

The moving of switch blade 59 into engagement with contact 61 does not at this time energize the motor 17 in view of the fact that the temperature of the heating chamber is too low to cause switch 27 to be moved into a position wherein the contacts 31 and 32 are closed by the mercury element 30. Motor 17 accordingly will not operate at this time and the temperature of the space will continue to fall since no heat is being supplied to the space, and will continue to fall until the blade 134 engages the contact 137. A circuit through relay coil 46 is now established, this circuit being as follows: from the low tension secondary 66 through conductor 70, bimetallic element 41, arm 134, contact 137, conductors 80 and 81 through the coil 46, and conductors 82 and 75 to the other side of secondary 66. Energization of coil 46 causes blades 48 and 49 to move into engagement with contacts 50 and 52, respectively. Engagement of blade 48 with contact 50 closes a holding circuit for the coil 46 which is independent of the blade 134, this circuit being as follows: from the secondary 66, through conductor 70, bimetallic element 41, blade 133, contact 136, conductor 43, heater 42, conductor 71, blade 48, contact 50, conductors 83 and 81 through the coil 46, and conductors 82 and 75 to the other side of the secondary 66. It should be noted that the holding circuit for the coil 46 is through the heater 42 but little heat will be generated in the heater 42 as long as the blade 134 is in engagement with the contact 137.

Energization of coil 46 causes blade 49 to engage the contact 52 and close a circuit through the oil burner 12 as follows: from the line 66 through conductors 85 and 86, contact 52, blade 49, conductor 87, contact 35 of switch 28 through the mercury element 33, contact 34, conductor 88, terminal 13 of the oil burner motor through said motor to terminal 14 and conductors 89 and 90 to the line 61. Energization of the oil burner 12 will cause the temperature of the heating chamber to rise and after it has risen to a predetermined value the switch 27 will be tilted to a position wherein contacts 31 and 32 are closed. The blower motor 17 is now energized through the following circuit: from the line 60 through conductors 85, 91, contact 61, blade 59, conductor 92, contacts 31 and 32 of switch 27, conductor 93 to terminal 18 of motor 17, through said motor to terminal 19 and conductors 94 and 90 to the line 61.

Energization of motor 17 causes operation of blower 15 and the warm air in the heating chamber will now be circulated through the space to be heated. After the temperature of the space has risen to a predetermined value, blade 136 of thermostat 40 will move away from contact 137. Relay coil 46 which controls the operation of the oil burner 12 is now energized only by means of its holding circuit, which it will be remembered was through the electrical heater 42. The electrical heater 42 will now begin to heat up, causing the temperature immediately adjacent the bimetallic element 41 to rise and after a short time interval the temperature around the bimetallic element 41 will have risen to a point wherein the arm 133 moves away from the contact 136. When this happens the relay coil 46 will be deenergized and switch blades 48 and 49 will move out of engagement with contacts 50 and 52, respectively. The moving away of blade 49 from contact 52 opens the circuit through the oil burner 12 whereupon the supply of heat to the heating chamber is stopped. The blower 17 will continue to operate as long as arm 132 is in engagement with contact 135 and it is intended that in the normal operation of the system the temperature of the space will never become high enough to cause blade 132 to move out of engagement with contact 135 so that the blower 15 operates continuously.

When the temperature of the space again falls to a value low enough to cause blade 134 to engage contact 137, as it will, since the oil burner 12 is not operating at this time, the oil burner will again be energized through the previously described circuit whereupon the temperature of the heating chamber again rises and the air circulated by blower 15 will have an increasingly higher temperature, thus causing the temperature of the space to rise until blade 134 again moves away from contact 137. When this happens, the heater 42 will again be energized and artificially heat the thermostat 40 thus causing blade 133 to move out of engagement with contact 136.

The purpose of artificially heating the thermostat 40 is to stop the operation of the oil burner 12 before the temperature of the space reaches a value high enough to cause blade 133 to move out of engagement with contact 136. Otherwise, the burner would continue to operate for a greater length of time, causing the temperature of the heating chamber to rise to a higher value and there would be a possibility, after the operation of the oil burner 12 stops, that the temperature of the heating chamber would be high enough and that there would be sufficient residual heat in said chamber to cause the temperature of the space to rise to a value higher than that desired with the result that the fan 17 would stop and there would be no forced circulation of air through the room. The result of this type of operation would be that the temperature of the space would not be maintained at as nearly a uniform temperature as in my improved system. By continuously operating the blower 15, the air is constantly circulated through the space and there is no danger of stratification of the air in said space as happens when there is no forced circulation of air, and the air being cooled by the windows, etc. falls to the lower portions of the space with the result that the temperature of the air surrounding the thermostat may be at a considerably higher temperature than that near the floor.

It is particularly desirable to have the oil burner 12 under the control of two blades of the thermostat which open at different temperatures for the following reason: if the burner were under the control of blade 134 only, the burner would start to operate every time that blade 134 engaged contact 137, and as soon as the blade moved away from its contact the burner would stop. In other words, the burner would start and stop when the temperature of the room was at practically the same values, thus causing very frequent operation of the burner 12 which is highly objectionable in the operation of an oil burner as is well known. Also, chattering of the blades of a single contact thermostat having no operating differential with consequent unstability would make such a control impractical. By providing a differential controlled by the blades 133 and 134 and artificially heating the thermostat after blade 134 moves away from contact 137, it is possible to provide a sufficiently long period of operation of the burner 12 while at the same time eliminating the danger of the temperature in the space overrunning.

With my improved circuit I am enabled to control the operation of the system with a single thermostat employing three sets of contacts which open sequentially. The first and second sets of contacts control the operation of the burner and the second and third sets control the operation of the blower. By the use of the heater in series with the second set of contacts, and the provision of means rendering said heater ineffective until the first set of contacts has opened, I am able to control my heating system by the use of a relatively simple circuit employing a single thermostat. The circuit is obviously capable of use in other systems and while it has been illustrated only in conjunction with a heating system employing a burner and a blower, it should be understood that it is not limited to this use.

Having described the preferred form of my invention, it should be understood that it is capable of modifications by those skilled in the art and I wish it to be understood that the invention is to be limited only by the scope of the appended claims.

I claim as my invention:

1. In a control system, a main control device including a plurality of pairs of cooperating contacts, a pair of devices controlled thereby, means responsive to the closure of a second pair of contacts for energizing one of said devices, means operative upon said one device being energized to create a holding circuit for said device through a first pair of contacts, whereby said device remains energized as long as said first pair of contacts remains closed irrespective of the second pair of contacts, means responsive to the closure of a third pair of contacts for energizing the second device, and means including said second pair of contacts for creating a holding circuit for said second device, whereby said second device remains energized as long as said second pair of contacts remains closed, irrespective of the third pair of contacts.

2. In a heating system, a heater, means for circulating a temperature changing medium through said heater and through a space to be heated, temperature responsive means in the space to be heated, means under the control of the temperature responsive means for causing operation of said heater whenever the temperature in the space drops below a predetermined low value, means for causing said thermostat to interrupt operation of the heater at a time prior to that at which it would normally cause said interruption solely because of a predetermined temperature rise within said space, said time being such that the burner is operated for short frequent periods so that the temperature in the heater is maintained at a substantially constant value dependent upon the heating load, and such that continuous operation of the medium circulating means maintains a substantially constant desired temperature in the space being heated, and means under the control of the temperature responsive means for normally causing operation of the medium circulating means at all times unless the temperature in the space being heated rises to a high predetermined undesirable value.

3. In a temperature control system, a room thermostat including three movable contacts cooperating respectively with three fixed contacts, the contacts being so arranged that one set of contacts is closed upon the attainment of one predetermined low temperature, the second set of contacts is closed upon the attainment of a second predetermined low temperature and the third set of contacts is closed upon the attainment of a third predetermined low temperature, a pair of control devices, an electrical heating device in proximity to said thermostat, means for causing energization of one control device in response to the engagement of the first two pairs of contacts, means for maintaining said one control device energized until disengagement of both of said first two pairs of contacts, means causing energization of the second control device upon engagement of the second and third pairs of contacts, means for maintaining said second control device energized until disengagement of said second pair of contacts, means causing energization of said heater while said second control device is energized thus accelerating the opening of the second pair of contacts and means whereby the heater is de-energized upon the opening of the second pair of contacts.

4. In a heating system, a space thermostat having three sets of contacts that make successively in response to falling temperatures and break in reverse order upon rising temperatures affecting said thermostat, a heater, circulating means for circulating a temperature changing medium through said heater and through a space to be heated, means for causing operation of said circulating means when the first and second sets of contacts are made and for stopping operation of said circulating means only when both of said sets of contacts are broken, means for placing said heater in a heat increasing condition in response to the making of the second and third sets of contacts and placing said heater in a heat decreasing condition only in response to the breaking of both said second and third sets of contacts, and means for causing the second set of contacts to break sufficiently prior to the time they would normally break due to a rise in temperature in the space being treated that the heater is placed in heat increasing condition for short frequent periods such that the temperature of the heater is maintained at a substantially constant value dependent upon the heating load and such that continuous operation of the medium circulating means maintains a substantially constant temperature in the space being heated of a value just below that required to cause closure of said first set of contacts.

5. In a heating system, a space thermostat having three sets of contacts that make successively in response to falling temperatures and break in reverse order upon rising temperatures affecting said thermostat, a heater, circulating means for circulating a temperature changing medium through said heater and through a space to be heated, means for causing operation of said circulating means when the first and second sets of contacts are made and for stopping operation of said circulating means only when both of said sets of contacts are broken, means for placing the heater in heat increasing condition in response to the making of the second and third sets of contacts and placing the heater in heat decreasing condition only in response to the breaking of both of said sets of contacts, and means, including the second set of contacts, responsive to breaking of the third set of contacts for artificially supplying heat to the thermostat to cause the second pair of contacts to break prior to the time they would normally break due to a rise in temperature in the space being heated.

6. In a heating system, a warm air furnace, circulating means for circulating air through the furnace and through a space to be heated, a thermostat in the space to be heated, said thermostat including three sets of contacts that make and break in reverse order in response to falling and rising temperatures affecting said thermostat, means for causing operation of the circulating means when the second set of contacts is made and means whereby the circulating means continues to operate until the first set of contacts is broken, means placing said furnace in heat increasing condition when the third set of contacts is made, means whereby the furnace remains in this condition until the second set of contacts is broken, and means for causing the second set of contacts to break prior to the attainment of the predetermined temperature in the space required to break said second set of contacts.

7. In a heating system, a warm air furnace, circulating means for circulating air through the furnace and through a space to be heated, a thermostat in the space to be heated, said thermostat including three sets of contacts that make and break in reverse order in response to falling and rising temperatures affecting said thermostat, means for causing operation of the circulating means when the second set of contacts is made and means whereby the circulating means continues to operate until the first set of contacts is broken, means placing said furnace in heat increasing condition when the third set of contacts is made and means whereby the furnace remains in this condition until the second set of contacts is broken, and means for artificially supplying heat to the thermostat in response to the breaking of the third set of contacts until the second set of contacts is broken whereby the second set of contacts is broken prior to the attainment of the space temperature normally required to cause the breaking of said contacts.

WILLIAM L. McGRATH.